United States Patent [19]

Dudek

[11] Patent Number: 4,603,608
[45] Date of Patent: Aug. 5, 1986

[54] REMOTELY-MANIPULATED APPARATUS FOR PERFORMING MAINTENANCE WORK IN SHIELDED CELLS

[75] Inventor: Günther Dudek, Visselhövede, Fed. Rep. of Germany

[73] Assignee: Deutsche Gesellschaft für Wiederaufarbeitung von Kernbrennstoffen mbH, Hanover, Fed. Rep. of Germany

[21] Appl. No.: 652,765

[22] Filed: Sep. 20, 1984

[30] Foreign Application Priority Data

Sep. 24, 1983 [DE] Fed. Rep. of Germany ....... 3334580

[51] Int. Cl.⁴ .............................................. B25B 19/00
[52] U.S. Cl. ......................................... 81/463; 81/125
[58] Field of Search ........................ 81/125, 463–466, 81/52, 54, 57.4, 57.24, 55

[56] References Cited

U.S. PATENT DOCUMENTS

| | | | |
|---|---|---|---|
| 3,392,767 | 7/1968 | Stillwagon, Jr. | 81/125 X |
| 3,916,939 | 11/1975 | Gillaro | 81/125 X |
| 4,098,088 | 7/1978 | Mason | 81/52 X |
| 4,271,730 | 6/1981 | Holl et al. | 81/57.4 |

Primary Examiner—James G. Smith
Attorney, Agent, or Firm—Walter Ottesen

[57] ABSTRACT

The invention is directed to an apparatus for remote-controlled connection and disconnection of threaded bolts in a flange joint located in a radioactively-ladened cell. The apparatus includes a remotely controllable impact wrench carrying an extension shaft which is driven by the output shaft of the wrench. As a means of pulling the threaded bolts out of the through bores passing through the rear flange when a flange joint is being disconnected, a magnetic coil is arranged around the extension shaft. A voltage is applied to the coil thereby developing a magnetic force for holding the threaded bolts in the socket thereby permitting the threaded bolts to be moved away from the flange with the impact wrench.

9 Claims, 3 Drawing Figures

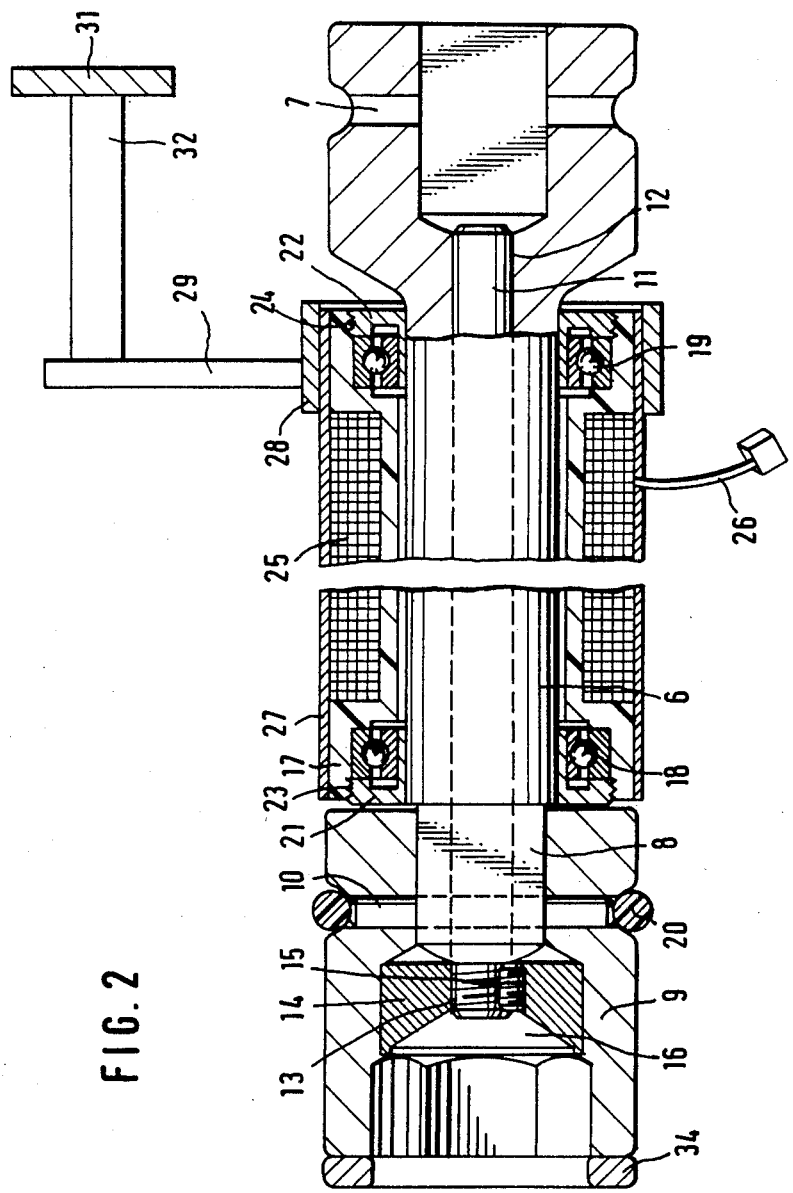

REMOTELY-MANIPULATED APPARATUS FOR PERFORMING MAINTENANCE WORK IN SHIELDED CELLS

FIELD OF THE INVENTION

The invention relates to an apparatus for the remotely-manipulated disconnection and connection of threaded bolts of a flange joint in a radioactively-ladened cell.

BACKGROUND OF THE INVENTION

For remotely-manipulated maintenance work on conduits and flange joints in processing components such as flange mounted valves or taps in radioactive cells of reprocessing installations, impact wrenches are used for the purpose of releasing or connecting the threaded bolts at the flange joints. In this connection, it has been proposed to join two connecting flanges by through bolts with threaded nuts arranged behind the flanges. The nuts are held in a form-tight manner in appropriate sockets provided on the rear flange so that they cannot rotate. To enable the flange mounted component to be removed from the conduit when the screws of the flange joints have been disconnected, it is necessary for the threaded bolts, once released from the associated nuts, to be pulled out of the bore extending through the flange at the nut side far enough to permit the component which has to be exchanged to be removed from the nuclear processing installation by remote control.

It has been found that, as the threaded bolt connections are released, the threaded bolts which have been threadably disengaged from the nuts corresponding thereto may still be left in the bores extending through the flange at the nut side. Remote-controlled removal of the appropriate length of conduit or component thus becomes difficult or even impossible under this circumstance.

SUMMARY OF THE INVENTION

It is an object of the invention to provide an apparatus of the above-mentioned type with which a flange joint can be disconnected in such a way that the threaded bolts no longer remain stuck in the bores in the rear flange and impede the dismantling of the component to be exchanged.

The apparatus of the invention performs the remotely-manipulated connection and disconnection of fasteners such as the threaded bolts of a flange joint in a radioactively-ladened cell. The apparatus includes a remotely-controlled wrench having a drive shaft and a holder for engaging the threaded bolt to be connected or disconnected. An extension shaft is disposed between the drive shaft and the holder and energizable magnetic means are mounted on the extension shaft for developing a magnetic force for holding the threaded bolt so that it does not become stuck during disconnection thereof. The magnetic means can be, for example, a coil disposed in surrounding relationship to the extension shaft. The holder can be a socket such as a hex-socket, for example.

After the socket of the impact wrench has been placed by remote manipulation on the threaded bolt to be disconnected in a flange joint, the threaded bolt is disconnected in the usual way by operating the impact wrench. While the threaded bolt is being threadably disengaged from the hexagonal nut of the rear flange, the extension shaft and the socket of the impact wrench are magnetized by applying direct current to the magnetic coil arranged on the extension shaft of the wrench. The threaded bolts are made of a magnetizable material and are held tightly in the socket of the wrench. If the wrench is moved away from the flange joint, the threaded bolt is held tightly at the head thereof and withdrawn from the bore in the flange at the nut side. The threaded bolts which are located on the flange of the component to be exchanged and which are normally secured therein now no longer impede the detachment and remote-controlled removal of the detached component or length of connecting conduit.

The magnetic coil is arranged in surrounding relationship to the extension shaft and is securely mounted on the extension shaft by two ball bearings at respective longitudinal ends of the coil. The coil is further fixed against rotation with respect to the housing by a fastening bracket on the housing of the impact wrench. Alternatively, the bracket can be mounted to a carrier frame holding the impact wrench. The magnetic coil is held securely by the fastening bracket thereby preventing the same from being rotated. The rotation of the extension shaft relative to the coil is made possible by the arrangement of the roller bearings.

According to still another feature of the invention, a protective tube is arranged in surrounding relationship to the magnetic coil and includes a plurality of ventilating apertures formed therein. The protective tube effectively protects the magnetic coil which is an important consideration where remote manipulation is involved.

Pursuant to another feature of the invention, a soft iron core is placed inside the extension shaft. The soft iron core has a threaded front end portion which projects into the socket mounted on the extension shaft. A soft iron headpiece is mounted on and threadably engages the front end portion of the soft iron core. The soft iron core is inserted along the longitudinal axis of the extension shaft and the soft iron headpiece is threadably held thereon in the socket thereby increasing the magnetic flux through the extension shaft and thus providing a stronger hold for the through bolt which has to be threadably disengaged and withdrawn.

According to a further feature of the invention, a ring-shaped disc made of nonmagnetic, metallic material is fixedly attached to the end face of the socket. Also, a spacer in the form of a disc made of nonmagnetic material can be mounted inside the socket at the base thereof. The discs act to interrupt any residual magnetism acting on the head of the threaded bolt after the electric voltage applied to the coil is switched off. Thus, the head of the threaded bolt is prevented from sticking in the socket of the impact wrench because of remanence.

The invention provides an apparatus which facilitates the remote-controlled release of flange joints. No additional remote-controlled steps are necessary to withdraw the flange bolts disconnected by the impact wrench from the bores extending through the flange.

BRIEF DESCRIPTION OF THE DRAWING

The invention will now be described with reference to the drawing wherein:

FIG. 2 is an elevation view, in section, of the extension shaft mounted on the front end of the impact wrench; and, FIG. 3 is an elevation view, in section, of the socket mounted on the front end of the extension shaft and equipped with a spacer made of nonmagnetic material as required by one embodiment of the invention.

DESCRIPTION OF THE PREFERRED EMBODIMENTS OF THE INVENTION

Figure 1:
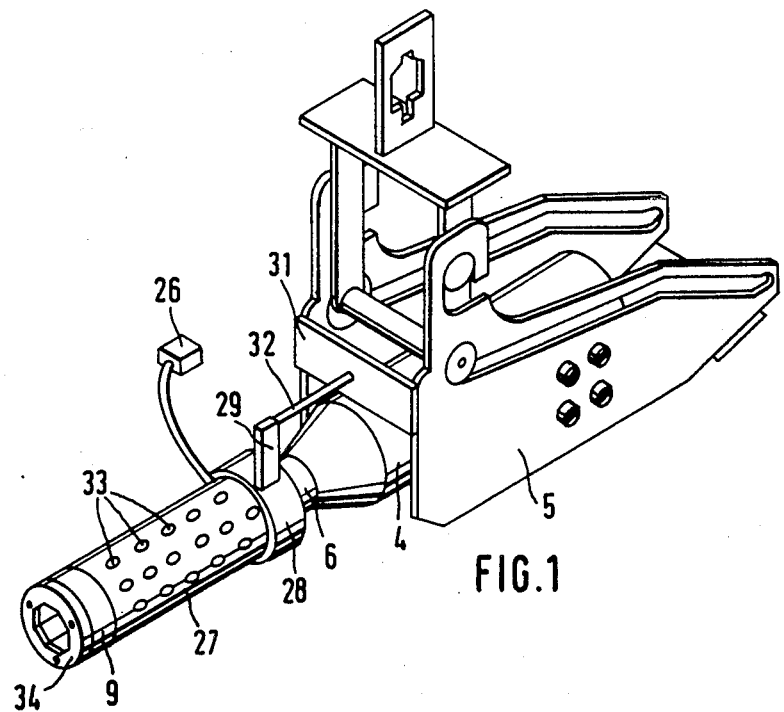
FIG. 1 is a perspective view of the apparatus according to the invention for the remotely-manipulated connection and disconnection of threaded bolts of a flange joint in a radioactively-ladened cell.

An impact wrench 4 is fixed in a carrying frame 5 adapted to be supported by a remotely-operated crane. An extension shaft 6 is placed on the wrench 4 and is secured to the drive shaft of the impact wrench by a pin (not shown) disposed in a radial hole of the drive shaft. The end of the extension shaft 6 has a projection 8 of square cross-section on which is placed a socket 9 for engaging the hexagonal head of a threaded bolt in a form-tight manner. The socket 9 is fixed on the square projection 8 by a securing pin 10 which passes radially through the projection and is held by a rubber ring 20.

A rod-shaped soft iron core 11 is arranged coaxially inside the extension shaft 6 in an axial bore 12 thereof. The end of the core 11 extends outwardly beyond the end of the projection 8 into the interior of the socket 9 and is provided with an external thread 13. A soft iron headpiece 14, which fits into the interior of the socket 9, threadably engages the external thread 13 and is secured by a threaded pin 15. The soft iron headpiece 14 has a conical portion 16 cut therefrom and faces towards the cavity of the socket 9 wherein the head of the threaded bolt is accommodated.

A coil holder 17 made of plastic is arranged around the extension shaft 6 and is supported on the shaft 6 at its ends by two ball bearings 18 and 19. The two ball bearings 18, 19 carrying the coil holder 17 are tightly held to the coil holder 17 by spacer rings 21, 22. The spacer rings 21 and 22 have external threads threadably engaging the internal threads 23 and 24, respectively, in the coil holder 17.

The coil holder 17 carries a winding 25. The coil holder 17 and winding 25 conjointly form a magnetic coil 17, 25. The magnetic coil 17, 25 may be connected to a voltage source of 60 volts DC by an electrical connection 26.

The coil 17, 25 is surrounded by a protective tube 27 which carries a fastening strut 29 extending perpendicularly from a metal bracket 28. The strut 29 is fixedly attached to the end plate 31 of the carrying frame 5 by a bolt 32. The coil 17, 25 is thus mounted on the impact wrench so as to be fixed against rotation.

The protective tube 27 contains a plurality of radial ventilation apertures 33.

A special steel disc 34 made of a nonmagnetic material is fixed to the free end surface of the socket 9.

Figure 3:
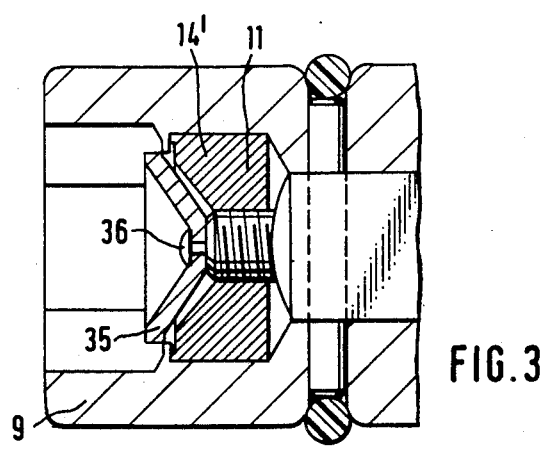

The embodiment according to FIG. 3 shows a spacing disc 35 mounted concentrically at the end of the soft iron core 11 and arranged substantially inside the socket 9 and at the bottom wall thereof. The disc 35 is fixed by a screw 36. The spacing disc 35 and screw 36 are made of a nonmagnetic material.

The apparatus of the invention described above operates as follows. When the through bolt for a flange joint with a threaded nut placed therebehind is disconnected by means of the impact wrench, a DC voltage of 60 volts is applied to the magnetic coil 17, 25 and the extension shaft 6 and socket 9 are magnetized. The magnetic flux through the extension shaft 6 and socket 9 is increased because of the soft iron core 11 and the soft iron headpiece 14 connected thereto. The head of the particular threaded bolt which has been disconnected is therefore held in the hex-socket 9 with adequate firmness.

The impact wrench apparatus 4, 5 is moved away from the flange joint by the remote-controlled crane (not shown). As a result of this movement, the through bolt is pulled out of the bore in the rear flange and is held in the socket 9 by the magnetic force.

The threaded bolts used in flange joints preferably have heads with a projecting collar extending about the lower periphery thereof.

The special steel disc 34, made of a nonmagnetic material, interrupts any residual magnetization acting on the collar of the head of the threaded bolt when the voltage has been disconnected. Accordingly, the bolt head is prevented from sticking in the socket 9 due to any remanence.

If the heads of the threaded bolts used do not have a lower collar extending therearound, then the embodiment of FIG. 3 of the extension shaft and socket is utilized. The spacing disc 35 made of a nonmagnetic material similarly interrupts the residual magnetization acting on the head of the threaded bolt when the voltage through the magnetic coil 17, 25 has been disconnected. The bolt head is again prevented from sticking in the socket 9 because of a remanent magnetism.

It is understood that the foregoing description is that of the preferred embodiments of the invention and that various changes and modifications may be made thereto without departing from the spirit and scope of the invention as defined in the appended claims.

What is claimed is:

1. An apparatus for the remotely-manipulated connection and disconnection of threaded fasteners of a flange joint in a radioactively-ladened cell, the apparatus comprising:

a remotely-controlled wrench including a drive shaft and a holder for engaging the fastener to be connected or disconnected;

an extension shaft disposed between said drive shaft and said holder for connecting said holder to said drive shaft for rotation therewith; and, energizable magnetic means mounted on said extension shaft for developing a magnetic force for holding the fastener in said holder as the same is disconnected and drawn from a flange of the flange joint.

2. The apparatus of claim 1, said magnetic means comprising: a magnetic coil of cylindrical configuration disposed in surrounding relationship to said extension shaft and having respective longitudinal ends; two ball bearings disposed at said ends for mounting said coil on said extension shaft; and, structure means for holding said coil to prevent rotation thereof with said extension shaft.

3. The apparatus of claim 3, comprising a carrier for carrying said wrench therein; and said wrench including a housing for accommodating said drive shaft therein; said housing being mounted to said carrier; said structure means being a strut fixedly connecting said coil with said housing or said carrier.

4. The apparatus of claim 2, comprising a protective tube disposed in surrounding relationship to said magnetic coil and having a plurality of ventilating openings formed therein.

5. The apparatus of claim 1, said extension shaft having a bore formed therein and extending along the longitudinal axis thereof, the apparatus further including a soft iron core disposed in said bore, said holder being a socket with an aperture formed in the base thereof; and, said soft iron core having a front end portion projecting through said aperture.

6. The apparatus of claim 5, said front end portion of said core having a thread formed thereon, said apparatus further comprising a soft iron piece disposed in said socket adjacent the base thereof and threadably engaging said core.

7. The apparatus of claim 6, said socket having an outermost end face facing away from said base thereof, said apparatus further comprising a ring-shaped disc of nonmagnetic material fixedly attached to said end face.

8. The apparatus of claim 5, comprising a spacer disc mounted concentrically with the longitudinal axis of said shaft at said base of said socket, said spacer disc being made of nonmagnetic material.

9. An apparatus for the remotely-manipulated connection and disconnection of threaded bolts of a flanged joint in a radioactively-ladened cell, the apparatus comprising:
  a remotely controlled impact wrench including a drive shaft;
  an extension shaft fixedly mounted to said drive shaft for rotation therewith;
  a socket mounted on the outer end of said extension shaft for engaging the threaded bolts;
  magnetic means arranged on said extension shaft for developing a magnetic force for holding the threaded bolt in said socket to facilitate withdrawal thereof from a flange of the flanged joint;
  electric supply means for supplying electric energy to said magnetic means; and,
  nonmagnetic metal means arranged in the path of the flux generated by said magnetic means to prevent remanent flux to continue to magnetically hold the threaded bolt after said electric energy has been swiched off.

* * * * *

UNITED STATES PATENT AND TRADEMARK OFFICE
CERTIFICATE OF CORRECTION

PATENT NO. : 4,603,608
DATED : August 5, 1986
INVENTOR(S) : Günther Dudek

It is certified that error appears in the above-identified patent and that said Letters Patent is hereby corrected as shown below:

In column 4, line 56: delete "claim 3," and substitute -- claim 2, -- therefor.

Signed and Sealed this

Eighth Day of March, 1994

Attest:

BRUCE LEHMAN

Attesting Officer

Commissioner of Patents and Trademarks